Patented July 11, 1939

2,165,206

UNITED STATES PATENT OFFICE 2,165,206

PEST CONTROL

Raymond F. Bacon, Bronxville, N. Y., and Isaac Bencowitz, Gulf, Tex., assignors to Texas Gulf Sulphur Company, Houston, Tex., a corporation of Texas No Drawing. Application February 25, 1936, Serial No. 65,687

4 Claims. (Cl. 167—14)

This invention relates to pest control and has for an object the production of improved fungicidal and insecticidal materials and the provision of an improved method of producing such materials. The invention further contemplates the provision of an improved method of treating plants to control parasitic and other pests.

The novel compositions of the invention comprise one or more metal sulphides which may be employed alone or in conjunction with other insecticidal or fungicidal materials or with inert diluent materials. Among the metal sulphides which we have found to be effective are aluminum sulphide, magnesium sulphide, calcium sulphide, zinc sulphide and phosphorus sulphides. While phosphorus is not a metal and phosphorus sulphide is not a metal sulphide, phosphorus sulphide, in its action as an insecticide, behaves in the same way as the true metal sulphides described herein, and, therefore the terms "metal" and "metal sulphide" will be employed hereinafter to include phosphorus and phosphorus sulphide, respectively. In forming the compositions of the invention, we prefer to prepare the metal sulphides by heating the metals in their elemental states with elemental sulphur at temperatures such that the metals and sulphur will react to produce metal sulphides.

The metal sulphides have quite different characteristics especially as regards the rate at which they give off hydrogen sulphide. Thus, for example, magnesium sulphide and aluminum sulphide are very readily hydrolyzed by water to give hydrogen sulphide and the respective oxides or hydroxides; phosphorus sulphide hydrolyzes very easily with water to give hydrogen sulphide and phosphoric acid; calcium sulphide is slowly hydrolyzed by water to give hydrogen sulphide and calcium hydroxide or calcium sulphydrate; and zinc sulphide is extremely slowly hydrolyzed by water, but it is readily broken down by a dilute acid to give hydrogen sulphide. The phosphorus sulphide which we prefer to employ is the pentasulphide ($P_2S_5$). Because of the fact that it gives phosphoric acid as one of its hydrolysis products, we prefer to use it in conjunction with some material such, for example, as basic magnesium carbonate or calcium carbonate which will neutralize the phosphoric acid produced.

In view of the different characteristics of the various sulphides, we have found it to be advantageous in certain cases to employ mixtures containing two or more metal sulphides. For example, when weather conditions are very damp, aluminum sulphide might be hydrolyzed so rapidly as to lose its effect before a sufficient number of insects have been killed. In such cases, a mixture of sulphides containing one or more metal sulphides which hydrolyze rapidly such, for example, as magnesium sulphide and aluminum sulphide and one or more metal sulphides which hydrolyze slowly may be employed advantageously to produce compositions having effective and sustained insect-killing powers.

It is advantageous to employ the metal sulphides in conjunction with other fungicides and insecticides or with inert diluent materials for several reasons. The use of a diluent material, whether inert or effective as a fungicide or insecticide, permits more accurate application of the correct amount of metal sulphide to the plants to be treated and permits more uniform spreading of the metal sulphide applied to the plants. The metal sulphides and their hydrolysis products have little or no burning tendency and, therefore, they may be employed in conjunction with other fungicides or insecticides which do have burning tendencies to lessen any possible burning of the plants treated and at the same time provide for more effective pest destruction.

We prefer to use elemental sulphur as a diluent for metal sulphides. Elemental sulphur is particularly advantageous as the diluting material because it is almost as cheap as other suitable diluting materials, and it has a very positive repellent action on insects and a positive fungicidal action. These actions continue while the sulphur is on the plants. We have found that the burning tendency of sulphur is reduced by the presence of metal sulphides. Consequently, the use of mixtures of elemental sulphur and metal sulphides of the type referred to herein has a two-fold advantage. Hydrolysis of the metal sulphide gives the mixture a very positive early killing power, and dilution of the elemental sulphur by the metal sulphide or its hydrolysis products lessens any possible burning of the foliage by the sulphur. Another advantage in employing elemental sulphur resides in the fact that the production of the mixture of sulphur and metal sulphide is simple and convenient. For example, in the production of an aluminum sulphide-sulphur mixture, aluminum powder may be mixed with a large excess of sulphur and heated to effect a reaction with the production of aluminum sulphide, and the resulting mixture of aluminum sulphide and elemental sulphur may be ground to a suitable degree of fineness and used directly.

For use as a dusting mixture, aluminum sulphide has many conspicuous advantages. It is very readily hydrolyzed by moisture either in the air or on the plants treated, and the solid product remaining is absolutely inert, that is, neither acid nor alkaline, and has no burning effect on the plant tissues. It may be used advantageously alone or mixed with other substances such as other metal sulphides, sulphur and other diluents. We have found a mixture consisting of about five (5%) percent aluminum sulphide and ninety-five (95%) percent elemental sulphur to be an excellent dusting insecticide and fungicide in a large number of cases. In order to obtain more sustained insecticidal properties, we have employed mixtures consisting of aluminum sulphide, calcium sulphide and zinc sulphide. Such mixtures have been highly effective and very satisfactory. In general, we have found that mixtures containing about five to ten (5 to 10%) percent by weight of aluminum sulphide, calcium sulphide or zinc sulphide, or all three sulphides in about equal proportions, and ninety to ninety-five (90 to 95%) percent of sulphur or some inert material are highly effective. The various components of the compositions of the invention may be used in any suitable relative proportions, and they may be ground to any suitable degrees of fineness by any suitable method or means known to the grinding art.

The compositions of the invention may be employed as dry, dusting powders or they may be incorporated in liquid sprays. Aluminum sulphide is not very well suited for use in water sprays because of its property of hydrolyzing rapidly in water. It may be used in such a spray, however, when a quick reaction is desired. When a composition of the invention is to be used in a water spray, aluminum sulphide may be omitted, or a small amount may be included to give a quick reaction, and one or more metal sulphides which hydrolyze more slowly may be included. A composition comprising calcium sulphide, zinc sulphide, a small amount of aluminum sulphide and wettable sulphur may be employed advantageously in a water spray to produce a continuing or sustained insecticidal effect.

Among the insects which have been exterminated and controlled successfully by means of the compositions or mixtures of the invention are: The eastern tent caterpillar (*Malacosoma americana* Fab), the meal worm (*Tenebrio moliter*), squash bug (*Anasa tristis*), potato flea beetle (*Epitrix cucumeric* Harris), striped and spotted cucumber beetles (*Diabrotica vittata* Fab and *Diabrotica duodecimpunctata* Fab), cabbage aphids (*brevicoryne brassicae* Linne), cabbage worm (*Pieris rapae*), Colorado potato beetle (*Leptimotarea decemlineata* Say), the cotton flea hopper, flea beetle (*Phyllotrata bipustulata*), and many others.

We claim:

1. A parasitical preparation, comprising a sulphide of phosphorus as an essential constituent thereof.

2. A parasitical preparation, comprising phosphorus pentasulphide and an alkaline earth metal carbonate.

3. A parasitical preparation, comprising a sulphide of phosphorus, and elemental sulphur.

4. A parasitical preparation, comprising phosphorus pentasulphide, and an alkaline earth metal carbonate, and elemental sulphur.

RAYMOND F. BACON.
ISAAC BENCOWITZ.